Jan. 16, 1968  L. A. LARSSON  3,363,778
LIFTING DEVICE FOR MOTOR VEHICLES
Filed March 14, 1966  2 Sheets-Sheet 1

Lars Albert Larsson,
Inventor

By Wenderoth, Lind and Ponack
Attorneys

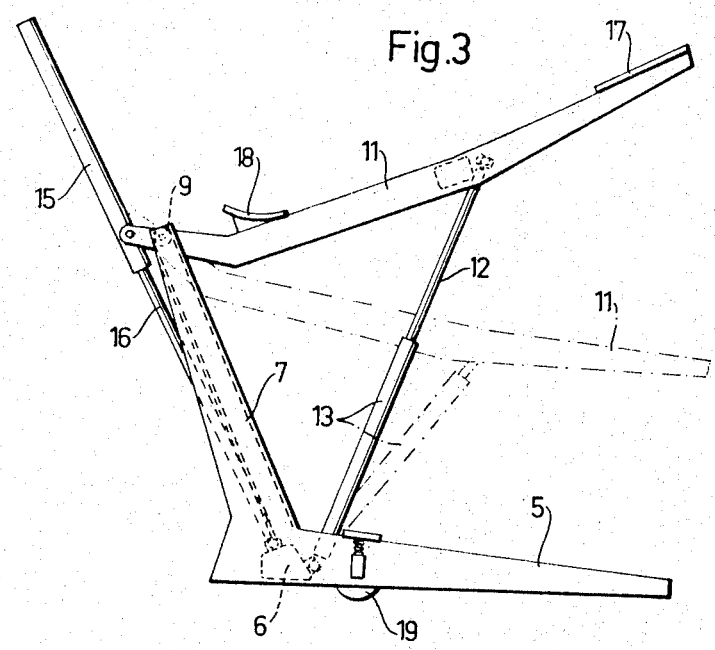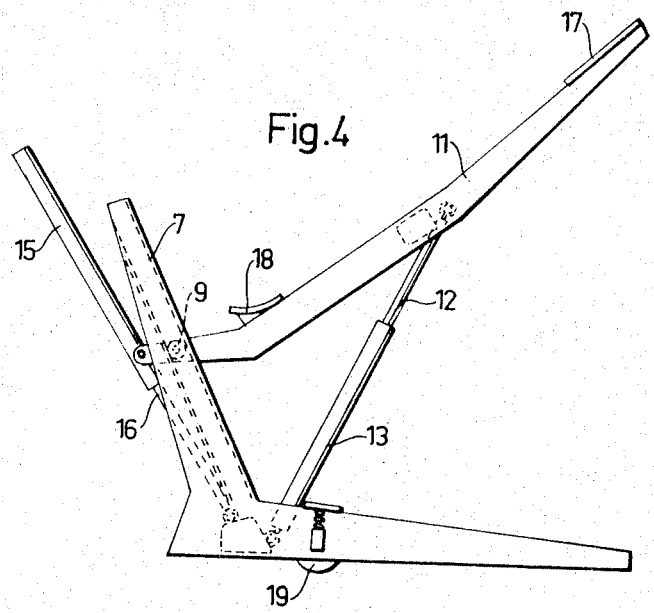

3,363,778
LIFTING DEVICE FOR MOTOR VEHICLES
Lars Albert Larsson, Box 497, Norsjo, Sweden
Filed Mar. 14, 1966, Ser. No. 533,900
Claims priority, application Sweden, May 17, 1965,
6,406/65
3 Claims. (Cl. 214—1)

The invention relates to an apparatus for lifting motor cars.

To enable performing of various kinds of repair and maintenance work on motor cars it is known to use an apparatus comprising a substantially horizontal supporting frame which carries pivotable lifting means hingedly connected thereto and arranged to be raised by pressure-operated cylinders.

The object of the invention is to provide an easily operable lifting apparatus by which a car may be raised up to a desired level and/or may be placed in a desired inclined position. For that purpose, upright members on the frame are formed with longitudinal guides for horizontal pilots which are mounted axially in alignment on the lifting means to permit said lifting means to be moved along the guides as well as to be swung in a vertical plane, and at least two pressure-operated jacks are mounted to engage the lifting means in the vicinity of the axis of the pilots and at a point remote from said axis, respectively, whereby said lifting means may be raised into a desired horizontal or inclined position.

Figure 1:
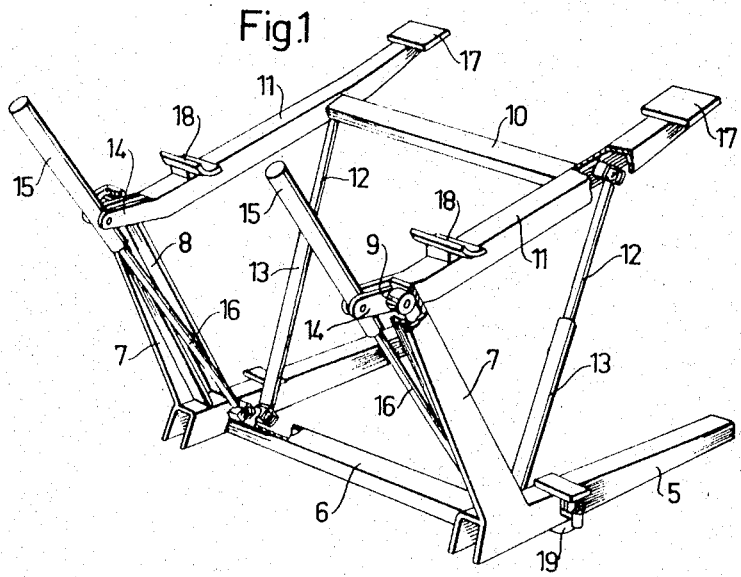
Figure 2:
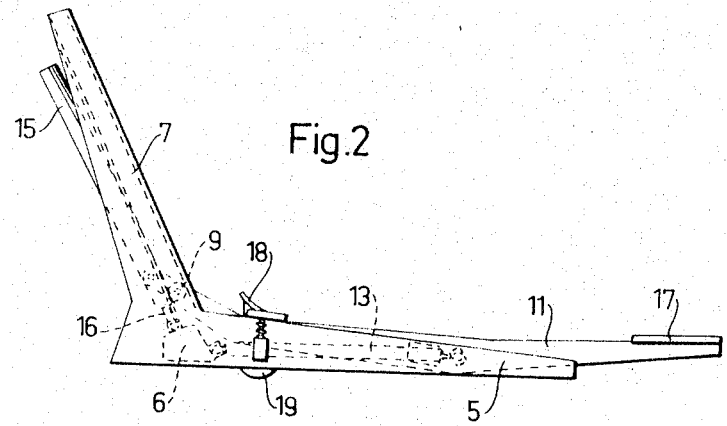

The invention will be described in more detail with reference to the accompanying drawings in which FIGURE 1 shows a perspective view of a suitable embodiment of the apparatus. FIGURES 2–4 show side views of the same apparatus in its initial position and in two different lifting positions, respectively.

As apparent especially from FIG. 1, the supporting frame consists of two spaced parallel beams 5 connected near their rear ends by a cross bar 6. Two approximately parallel uprights 7 extending from these rear ends of the beams 5 are preferably inclined backwards at an angle of 10–30° to the horizontal plane and in the embodiment shown the angle is about 20°. The uprights are provided with longitudinal, chute-shaped guide grooves 8 facing each other and serving to receive and guide the pilots 9 of a lifting frame.

The lifting frame consists of two parallel arms 11 U-shaped in cross section and connected by a cross bar 10. The arms 11 are located in vertical planes in parallel to and a little inside of the vertical planes of the supporting beams 5. The arms 11 are slightly bent and have their concave sides turned upwards to be able to grip a car from beneath without touching exhaust pipes etc. The cross bar 10 extends approximately between the middle portions of the arms 11 and near said bar 10 the arms are linked to the piston rods 12 of two pressure fluid operated cylinders 13 which are hingedly connected to the cross bar 6 of the supporting frame. The rear ends 14 of the arms, which are preferably fork-shaped, extend beyond the uprights 7 and are hingedly connected to pressure fluid operated cylinders 15. The piston rods 16 of said cylinders 15 are directed downwards and linked to the cross bar 6 of the supporting frame. At the forked ends 14 the arms 11 carry horizontal pilots 9 which engage the guide grooves 8 of the uprights 7. Preferably the pilots carry rollers to facilitate the movement. The pilots 9 are disposed along a horizontal line perpendicular to the arms 11, and all the hinged connections with cylinders and piston rods are such that they permit the lifting frame to pivot in a vertical plane in parallel to the longitudinal direction of the arms 11.

Each of the arms 11 carries two spaced plates, one plate 17 at its free end and one plate 18 at a little distance from the pilot 9. The plates 17, 18 are preferably coated with rubber and are adapted to serve as supports for the framing or chassis of a car to be lifted. The rear plates 18 are bent a little to prevent the car from sliding laterally in inclined position.

The supporting beams 5 may be provided with wheels 19 to facilitate transport of the apparatus. The wheels are mounted on springs (not shown) which permit them to be forced back into inoperative positions when the apparatus is loaded with a car. Finally, it may be mentioned that a motor driven compressor or preferably a hydraulic motor must be associated with the device. All the cylinders may be adapted to be connected simultaneously to the source of pressure fluid by means of a single valve, but it is also possible to connect the two pairs of cylinders 13 and 15 separately.

In the initial position shown in FIG. 2, the two lifting arms 11 are located in approximately the same plane as the supporting beams 5. Also the cylinders 13 are substantially horizontal in this position and all the piston rods 12, 16 are practically wholly retracted in their cylinders. When the load has been applied, pressure fluid is supplied to the cylinders 15, and as a result thereof the pilots 9 move upwards in the guide grooves 8, whereby the rear ends of the arms 11 are lifted. During this lift the two cylinders 13 serve as links and swing around their pivots, and at the end of the movement the arms 11 have assumed the position indicated by dash-and-dot lines in FIG. 3. Pressure fluid may then be supplied to the cylinders 13 to move the arms 11 into the inclined position shown by full lines in FIG. 3. For reasons of stability the inclination should never exceed 40°.

A particularly interesting effect of the new structure is that the lifting occurs in the sequence described above even if all the cylinders 13, 15 are connected simultaneously, as the cylinders 15 have substantially smaller moment forces to overcome than the cylinders 13 which initially are located in very disadvantageous angular positions in relation to the lifting arms. Therefore, the cylinders 15 move to their upper positions before the piston rods 12 begin to move from the cylinders 13, but already at the start of the movement of cylinders 15 the cylinders 13 are caused to swing around their lower pivots because the rearwardly inclined guide grooves 8 force the arms 11 to move backwards. Of course, a prerequisite for this function is that the cylinders 13 do not have much larger cross sectional areas than the cylinders 15. Preferably both pairs of cylinders have equal cross sectional areas and consequently equal lifting powers, since they receive pressure fluid from the same source.

If desired, the lifting device may be set in other positions, e.g. in the position shown in FIG. 4, wherein the pilots 9 are located at aapproximately half the height of the uprights 7. This position may be obtained by stopping the fork ends 14 of the arms 11 against pins introduced into holes (not shown) which may be provided in the uprights 7 for this purpose. After such a stop, the cylinders 13 automaticalily begin to operate and move the arms 11 upwards into the highly inclined position shown in FIG. 4.

When compared with previous lifting means the new apparatus involves a simplification at the same time as the operation is facilitated and to some extent automatized so that no attendance is necessary during the lifting.

What I claim is:
1. An apparatus for lifting motor cars, comprising a substantially horizontal supporting frame, two uprights provided in spaced relationship on said frame, longitudinal guides arranged in parallel to each other in said uprights, lifting means located above the supporting frame, horizontal pilots provided axially in alignment on the lifting means and arranged to engage said guides to permit the lifting means to be moved vertically as well as to be swung in a vertical plane and at least two pressure-operated jacks mounted to engage the lifting means in the vicinity of the axis of the pilots and at a point remote from said axis, respectively, whereby said lifting means may be raised into a desired horizontal or inclined position.

2. An apparatus as claimed in claim 1, characterized in that the uprights are inclined rearwards at an angle of 10–30°, preferably about 20°, to the horizontal plane.

3. An apparatus as claimed in claim 1, characterized in that the pressure-operated jacks are adapted to be connected simultaneously to the source of pressure fluid.

References Cited

UNITED STATES PATENTS

| | | | |
|---|---|---|---|
| 3,150,784 | 9/1964 | Rothe | 214—1 |
| 3,223,251 | 12/1965 | Rothe | 214—1 |

GERALD M. FORLENZA, *Primary Examiner.*

G. F. ABRAHAM, *Assistant Examiner.*